US012706375B2

(12) United States Patent
Gurbuz et al.

(10) Patent No.: US 12,706,375 B2
(45) Date of Patent: Aug. 11, 2026

(54) WIRELESS COMMUNICATION DEVICES

(71) Applicant: Apple Inc., Cupertino, CA (US)

(72) Inventors: Ozan D Gurbuz, Sunnyvale, CA (US); Ajay R Mistry, Sunnyvale, CA (US); Gautam Narasimhan, San Francisco, CA (US); Logan T Fikrig, San Francisco, CA (US); Thuy Nguyen, San Jose, CA (US); YoungHoon Kim, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/799,435

(22) Filed: Aug. 9, 2024

(65) Prior Publication Data

US 2026/0045683 A1 Feb. 12, 2026

(51) Int. Cl.
*H01Q 1/50* (2006.01)
*H01Q 1/42* (2006.01)

(52) U.S. Cl.
CPC ............... *H01Q 1/422* (2013.01); *H01Q 1/50* (2013.01)

(58) Field of Classification Search
CPC .. H01Q 1/38; H01Q 1/48; H01Q 1/50; H01Q 1/243; H01Q 1/422; H01Q 5/357; H01Q 13/103
See application file for complete search history.

(56) References Cited

U.S. PATENT DOCUMENTS

| | | | | |
|---|---|---|---|---|
| 10,050,332 | B2 * | 8/2018 | Kim | H01Q 1/50 |
| 10,283,844 | B2 * | 5/2019 | Rajagopalan | H01Q 1/2291 |
| 2014/0240190 | A1 * | 8/2014 | Chen | H01Q 5/30 343/843 |
| 2016/0261023 | A1 * | 9/2016 | Di Nallo | H01Q 9/42 |
| 2018/0048058 | A1 * | 2/2018 | Ehman | H01Q 1/2291 |
| 2018/0062263 | A1 | 3/2018 | Ueda | |
| 2019/0074586 | A1 * | 3/2019 | Ruaro | H01Q 9/04 |
| 2020/0161745 | A1 | 5/2020 | Khripkov et al. | |
| 2021/0096515 | A1 * | 4/2021 | Ruaro | G04G 21/04 |
| 2021/0305679 | A1 | 9/2021 | Ramm | |
| 2022/0102864 | A1 | 3/2022 | Morimoto et al. | |
| 2022/0352635 | A1 | 11/2022 | Compton | |
| 2023/0084538 | A1 | 3/2023 | Mu et al. | |

* cited by examiner

*Primary Examiner* — Tung X Le
(74) *Attorney, Agent, or Firm* — Treyz Law Group, P.C.; Tianyi He

(57) ABSTRACT

A wireless communication system may include an electronic device having wireless communication circuitry. The wireless communication circuitry may operate through an exterior-facing slot in an electronic device housing sidewall and may include components provided on a printed circuit having portions disposed on multiple interior housing surfaces of the electronic device. The wireless communication system may include external equipment having corresponding wireless communication circuitry communicatively coupled to the wireless communication circuitry of the electronic device through the slot in the housing sidewall.

20 Claims, 9 Drawing Sheets

WIRELESS COMMUNICATION DEVICES

BACKGROUND

This relates generally to electronic devices, including electronic devices with wireless communication circuitry.

Electronic devices are sometimes provided with wired connectors that enable wired connections to external equipment. Among other issues, some wired connector structures can be bulky and take up excess space within an electronic device. Accordingly, for at least some applications, it may be desirable to provide wireless communication circuitry.

To provide compact electronic devices, manufacturers are continually striving to implement wireless communication circuitry using compact structures that coexist with other electronic device components in a space-efficient manner, while ensuring that the wireless communication circuitry is able to exhibit satisfactory performance.

SUMMARY

An electronic device may include wireless communication circuitry. The electronic device may use the wireless communication circuitry to establish a wireless communication link with external equipment. The wireless circuitry may include one or more antennas, radio-frequency transceiver circuitry, and one or more radio-frequency transmission lines communicatively coupling the antenna(s) to the radio-frequency transceiver circuitry. The antenna(s) may be formed from antenna structures, such as antenna resonating elements, antenna feed elements, and antenna ground structures collectively integrated within layers of a printed circuit, thereby forming an antenna on the printed circuit.

The antenna may be disposed on an electronic device housing sidewall. The housing sidewall may include a slot, such as an exterior-facing slot configured to receive a band or strap. The antenna may be aligned with one end of the slot and configured to convey radio-frequency signals to and from an exterior of the electronic device through the slot. An intervening portion of the housing sidewall between the antenna and the end of the slot may be formed using dielectric material surrounded by an electrically conductive portion of the housing sidewall.

The printed circuit may be a flexible printed circuit that has portions that bend about different bend axes and are disposed on multiple interior surfaces of electronic device housing structures. Accordingly, wireless communication circuitry components provided on the flexible printed circuit may conform to interior surfaces of the electronic device housing and/or other internal structures.

DETAILED DESCRIPTION

Figure 1:
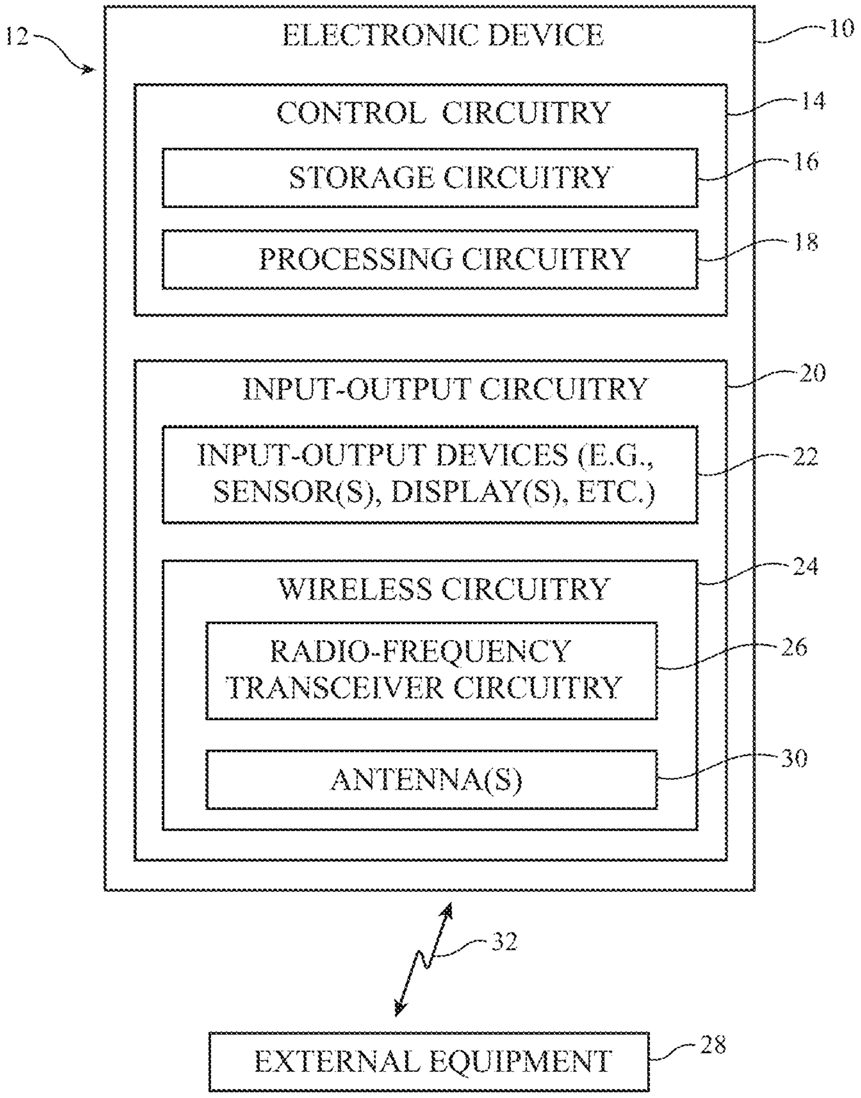
FIG. 1 is a block diagram of an illustrative electronic device configured to perform wireless communications with external equipment in accordance with some embodiments.

Electronic devices may communicate with one another using wireless communications and may sometimes be referred to herein as wireless communication devices. An illustrative wireless communication system containing multiple wireless communication devices is shown in FIG. 1. The wireless communication system may include an electronic device such as electronic device 10 configured to communicate wirelessly with other electronic devices or equipment external to electronic device 10. Electronic devices or equipment in the wireless communication system may include computing devices such as laptop computers, desktop computers, computer monitors containing embedded computers, tablet computers, cellular telephones, media players, or other handheld or portable electronic devices, smaller devices such as wristwatch devices, pendant devices, headphone or earpiece devices, devices embedded in eyeglasses or other equipment worn on a user's head, or other wearable or miniature devices, televisions, computer displays that does not contain embedded computers, gaming devices, navigation devices, embedded systems such as a system in which electronic equipment with a display is mounted in a kiosk or automobile, wireless internet-connected voice-controlled speakers, home entertainment devices, remote control devices, gaming controllers, peripheral user input devices, wireless base station or access points, wireless power devices, firmware testing, debugging, and/or restoring equipment, equipment or devices that implement the functionality of two or more of the aforementioned equipment or devices, and other electronic equipment or devices.

As shown in the functional block diagram of FIG. 1, an illustrative electronic device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, parts or all of housing 12 may be formed from dielectric or other low-electrical-conductivity material (e.g., glass, ceramic, plastic, sapphire, etc.). In other situations, housing 12 or at least some of the structures that make up housing 12 may be formed from metal or other electrically conductive materials.

Device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include one or more processors, microprocessors, microcontrollers, digital signal processors, host processors, baseband processor integrated circuits, application specific integrated circuits, central processing units (CPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include one or more non-transitory (tangible) computer-readable storage media that store the software code). The software code may sometimes be referred to as program instructions, software, firmware, data, instructions, or code. Software code stored on storage circuitry 16 may be executed by processing circuitry 18.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) New Radio (NR) protocols, etc.), antenna diversity protocols, satellite navigation system protocols (e.g., global positioning system (GPS) protocols, global navigation satellite system (GLONASS) protocols, etc.), antenna-based spatial ranging protocols (e.g., radio detection and ranging (RADAR) protocols or other desired range detection protocols for signals conveyed at millimeter and centimeter wave frequencies), or any other desired communications protocols. Each communications protocol may be associated with a corresponding radio access technology (RAT) that specifies the physical connection methodology used in implementing the protocol.

Device 10 may include input-output circuitry 20. Input-output circuitry 20 may include input-output devices 22. Input-output devices 22 may be used to allow data to be supplied to device 10 and to allow data to be provided from device 10 to external devices. Input-output devices 22 may include user interface devices, data port devices, sensors, and other input-output components. For example, input-output devices 22 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors (e.g., a capacitive proximity sensor and/or an infrared proximity sensor), magnetic sensors, force sensors (e.g., force sensors coupled to a display to detect pressure applied to the display), temperature sensors, depths sensors, and other sensors and input-output components.

Input-output circuitry 20 may include wireless circuitry such as wireless circuitry 24 for wirelessly conveying radio-frequency signals (e.g., to support wireless communications and/or radio-based spatial ranging operations). While control circuitry 14 is shown separately from wireless circuitry 24 in the example of FIG. 1, wireless circuitry 24 may include processing circuitry that forms a part of processing circuitry 16 and/or storage circuitry that forms a part of storage circuitry 18 of control circuitry 14 (e.g., portions of control circuitry 14 may implement wireless circuitry 24).

As an example, control circuitry 14 may include baseband processor circuitry and other radio components that form a part of wireless circuitry 24. Radio components (forming one or more radios) may transmit and/or receive radio-frequency signals according to a respective radio access technology (RAT) that determines the physical connection methodology. The one or more radios may implement multiple RATs if desired. As examples, the radios in device 10 may include a UWB radio for conveying UWB signals, a Bluetooth (BT) radio for conveying BT signals, a Wi-Fi radio for conveying WLAN signals, a cellular radio for conveying cellular telephone signals (e.g., in 4G frequency bands, 5G FR1 bands, and/or 5G FR2 bands), and an NFC radio for conveying NFC signals. These examples are merely illustrative and, in general, each radio may cover any desired combination of RATs.

Wireless circuitry 24 may include radio-frequency (RF) transceiver circuitry 26 formed from one or more integrated circuits, power amplifier circuitry, low-noise input amplifiers, passive RF components, one or more antennas 30, RF transmission lines, and other circuitry for handling RF wireless signals.

Wireless circuitry 24 may include radio-frequency transceiver circuitry 26 for handling transmission and/or reception of radio-frequency signals within corresponding frequency bands at radio frequencies (sometimes referred to herein as communications bands or simply as "bands"). The frequency bands handled by radio-frequency transceiver circuitry 26 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone communications bands such as a cellular low band (LB) (e.g., 600 to 960 MHz), a cellular low-midband (LMB) (e.g., 1400 to 1550 MHz), a cellular midband (MB) (e.g., from 1700 to 2200 MHz), a cellular high band (HB) (e.g., from 2300 to 2700 MHz), a cellular ultra-high band (UHB) (e.g., from 3300 to 5000 MHz, or other cellular communications bands between about 600 MHz and about 5000 MHz), 3G bands, 4G LTE bands, 3GPP 5G New Radio Frequency Range 1 (FR1) bands below 10 GHz, 3GPP 5G New Radio (NR) Frequency Range 2 (FR2) bands between 20 and 60 GHz, other centimeter or millimeter wave frequency bands between 10-300 GHz, terahertz frequency bands between 300 GHz and 10 THz, near-field communications frequency bands (e.g., at 13.56 MHz), satellite navigation frequency bands such as the Global Positioning System (GPS) L1 band (e.g., at 1575 MHz), L2 band (e.g., at 1228 MHz), L3 band (e.g., at 1381 MHz), L4 band (e.g., at 1380 MHz), and/or L5 band (e.g., at 1176 MHz), a Global Navigation Satellite System (GLONASS) band, a BeiDou Navigation Satellite System (BDS) band, ultra-wideband (UWB) frequency bands that operate under the IEEE 802.15.4 protocol and/or other ultra-wideband communications protocols (e.g., a first UWB communications band at 6.5 GHz and/or a second UWB communications band at 8.0 GHz), communications bands under the family of 3GPP wireless communications standards, communications bands under the IEEE 802.XX family of standards, satellite communications bands such as an L-band, S-band (e.g., from 2-4 GHz), C-band (e.g., from 4-8 GHz), X-band, Ku-band (e.g., from 12-18 GHz), Ka-band (e.g., from 26-40 GHz), etc., industrial, scientific, and medical (ISM) bands such as an ISM band between around 900 MHz and 950 MHz or other ISM bands below or above 1 GHz, one or more unlicensed bands, one or more bands reserved for emergency and/or public services, and/or any other desired frequency bands of interest. Wireless circuitry 24 may also be used to perform spatial ranging operations if desired.

Radio-frequency transceiver circuitry 26 may include respective transceivers (e.g., transceiver integrated circuits or chips) that handle each of these frequency bands or any desired number of transceivers that handle two or more of these frequency bands. In scenarios where different transceivers are coupled to the same antenna, filter circuitry (e.g., duplexer circuitry, diplexer circuitry, low pass filter circuitry, high pass filter circuitry, band pass filter circuitry, band stop filter circuitry, etc.), switching circuitry, multiplexing circuitry, or any other desired circuitry may be used to isolate radio-frequency signals conveyed by each transceiver over the same antenna (e.g., filtering circuitry or multiplexing circuitry may be interposed on a radio-frequency transmission line shared by the transceivers). Radio-frequency transceiver circuitry 26 may include one or more integrated circuits (chips) and/or integrated circuit packages (e.g., multiple integrated circuits mounted on a common printed circuit in a system-in-package device, one or more integrated circuits mounted on different substrates, etc.) containing power amplifier circuitry, up-conversion circuitry, down-conversion circuitry, low-noise input amplifiers, passive radio-frequency components, switching circuitry, transmission line structures, and other circuitry for handling radio-frequency signals and/or for converting signals between radio-frequencies, intermediate frequencies, and/or baseband frequencies.

In general, radio-frequency transceiver circuitry 26 may cover (handle) any desired frequency bands of interest. Radio-frequency transceiver circuitry 26 may convey radio-frequency signals using one or more antennas 30 (e.g., antennas 30 may convey the radio-frequency signals for transceiver circuitry 26). The term "convey radio-frequency signals" as used herein means the transmission and/or reception of the radio-frequency signals (e.g., for performing unidirectional and/or bidirectional wireless communications with external wireless communication equipment). Antennas 30 may transmit the radio-frequency signals by radiating the radio-frequency signals into free space (or to freespace through intervening device structures such as a dielectric cover layer). Antennas 30 may additionally or alternatively receive the radio-frequency signals from free space (e.g., through intervening device structures such as a dielectric cover layer). The transmission and reception of radio-frequency signals by antennas 30 each involve the excitation or resonance of antenna currents on an antenna resonating element in the antenna by the radio-frequency signals within the frequency band(s) of operation of the antenna.

Antennas 30 in wireless circuitry 24 may be formed using any suitable antenna types. For example, antennas 30 may include antennas with resonating elements that are formed from stacked patch antenna structures, loop antenna structures, patch antenna structures, inverted-F antenna structures, slot antenna structures, planar inverted-F antenna structures, waveguide structures, monopole antenna structures, dipole antenna structures, helical antenna structures, Yagi (Yagi-Uda) antenna structures, hybrids of these designs, etc. If desired, antennas 30 may include antennas with dielectric resonating elements such as dielectric resonator antennas. If desired, one or more of antennas 30 may be cavity-backed antennas. Two or more antennas 30 may be arranged in a phased antenna array if desired (e.g., for conveying centimeter and/or millimeter wave signals within a signal beam formed in a desired beam pointing direction that may be steered/adjusted over time). Different types of antennas may be used for different bands and combinations of bands.

If desired, device 10 may include other components. As examples, device 10 may include an energy storage device such as a battery, wireless power (transmitting and/or receiving) circuitry, and coil structures such as one or more coils. Device 10 may use wireless power circuitry and coil(s) to receive wirelessly transmitted power (e.g., wireless charging signals) from a wireless power adapter (e.g., a wireless power transmitting device) and/or transmit wireless power.

The wireless power adapter may pass AC currents through wireless power transmitting coil(s) to produce a time-varying electromagnetic (e.g., magnetic) field that is received as wireless power (wireless charging signals) by coil(s) in device 10. The wireless power circuitry may include converter circuitry such as rectifier circuitry that generates a DC voltage for powering device 10 from the wireless charging signals. The DC voltage produced by the rectifier circuitry may be used in charging the energy storage device and/or may be used in powering other components in device 10.

Antennas 30 may transmit and/or receive radio-frequency signals to convey wireless communication data between device 10 and one or more wireless communication equipment or devices external to device 10. In the illustrative example of FIG. 1, system 8 includes external (wireless communication) equipment 28 which may have one or more of the same elements as described above in connection with electronic device 10. In particular, external equipment 28 may include wireless circuitry having one or more radios, radio-frequency transceiver circuitry, one or more antennas, and one or more radio-frequency transmission lines.

Electronic device 10 and external equipment 28 may be communicatively coupled via one or more communication links 32 via respective wireless circuitry. Wireless communication data may be conveyed between device 10 and equipment 28 bidirectionally or unidirectionally. As examples, communication link(s) 32 may form a half-duplex communication link or a full-duplex communication link. In general, link(s) 32 may be established between respective wireless circuitry of device 10 and equipment 28 across a distance of less than ten inches, less than five inches, less than four inches, less than two inches, less than one inch, etc., and/or greater than one inch, greater than two inches, greater than five inches, etc. As examples, wireless communication link(s) 32 may convey data (e.g., debug, test, restore, and/or other data) at data rates of 100 Kilobit per second or more, 1 Megabit per second (Mbps) or more, 100

Mbps or more, 500 Mbps or more, 1 Gigabit per second (Gbps) or more, 10 Gbps or more, 100 Gbps or more, etc.

Configurations in which equipment 28 includes device testing equipment and/or device (firmware) updating equipment configured to perform device testing, debugging, restoring, and/or other functions relating to the testing and updating of device 10 are described herein as illustrative examples. If desired, equipment 28 may be other suitable types of devices and/or have other functionalities (e.g., a wireless charger).

As just a few examples, equipment 28 may convey, over link(s) 32, data that has been encoded into corresponding data packets such as containing data for software applications running on device 10, data for software updates for device 10, data for testing, debugging, and/or repairing device 10, data for resetting or restoring device 10 to a default or factory setting, data associated with a telephone call, a message, streaming media content, or internet browsing, etc. If desired, equipment 28 may include wireless power (transmitting) circuitry and coil structures such as one or more coils. Configured in this manner, equipment 28 may use its wireless power circuitry to transmit wireless power (signals) to device 10 (e.g., while conveying data over link 32). In illustrative configurations, equipment 28 may include support structures such as platforms, carriers, docks, or other structures which are configured to receive device 10 and to which wireless circuitry and other components (e.g., control circuitry, input-output devices, etc.) for equipment 28 are mounted. As examples, these support structures of equipment 28 may be formed of plastic, glass, ceramics, fiber composites, metal, other suitable materials, or a combination of these materials.

The example of FIG. 1 is merely illustrative. If desired, a wireless communication system may include any suitable number of electronic devices or equipment. If desired, device 10 may be communicatively coupled to one or more other electronic devices or equipment instead of or in addition to equipment 28, and/or may operate in isolation at times.

Figure 2:
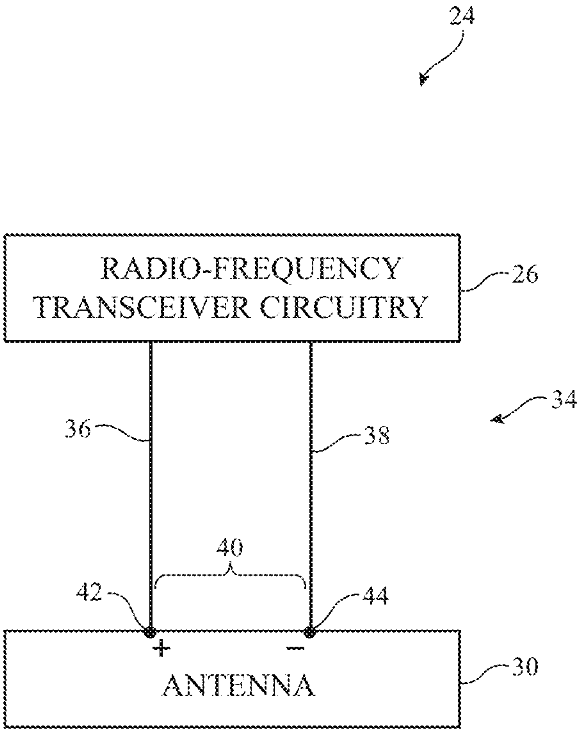
FIG. 2 is a block diagram of illustrative wireless circuitry in accordance with some embodiments.

FIG. 2 is a schematic diagram showing an illustrative portion of wireless circuitry 24 containing an antenna 30 communicatively coupled to radio-frequency transceiver circuitry 26 via radio-frequency transmission line path 34 (sometimes referred to as transmission line path 34). Other antennas 30 may be communicatively coupled to radio-frequency transceiver circuitry 26 using the same or other radio-frequency transmission line path(s) 34.

Transmission line path 34 may include a signal conductor such as signal conductor 36 (e.g., a positive signal conductor) and a ground conductor such as ground conductor 38. Signal conductor 36 may be coupled to positive antenna feed terminal 42 of antenna feed 40. Ground conductor 38 may be coupled to ground antenna feed terminal 44 of antenna feed 40.

Antenna 30 may include an antenna resonating (or radiating) element and an antenna ground, and if desired, a feed structure (sometimes referred to as a feeding element). Antenna feed 40 may include a positive antenna feed terminal 42 communicatively coupled to the antenna resonating element and a ground antenna feed terminal 44 coupled to the antenna ground. In some illustrative configurations, positive antenna feed terminal 42 may be electrically connected (shorted) to the feed structure which is communicatively coupled to the antenna reasoning element (e.g., via near-field electromagnetic coupling).

Transmission line path 34 may include one or more radio-frequency transmission lines. The radio-frequency transmission line(s) in transmission line path 34 may include stripline transmission lines (sometimes referred to herein simply as striplines), coaxial cables, coaxial probes realized by metalized vias, microstrip transmission lines, edge-coupled microstrip transmission lines, edge-coupled stripline transmission lines, waveguide structures, combinations of these, etc. Multiple types of radio-frequency transmission lines may be used to form transmission line path 34. Filter circuitry, switching circuitry, impedance matching circuitry, phase shifter circuitry, amplifier circuitry, and/or other circuitry may be interposed on or coupled along transmission line path 34, if desired. One or more antenna tuning components for adjusting the frequency response of antenna 30 in one or more bands may be interposed on or coupled along transmission line path 34 and/or may be integrated within antenna 30 (e.g., coupled between the antenna ground and the antenna resonating element of antenna 30, coupled between different portions of the antenna resonating element of antenna 30, etc.).

If desired, one or more of the radio-frequency transmission lines in transmission line path 34 may be integrated into ceramic substrates, rigid printed circuit boards, and/or flexible printed circuits. In one suitable arrangement, the radio-frequency transmission lines may be integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). If desired, the multiple layers of the laminated structures may be batch laminated together (e.g., in a single pressing process) without adhesive (e.g., as opposed to performing multiple pressing processes to laminate multiple layers together with adhesive).

Figure 3:
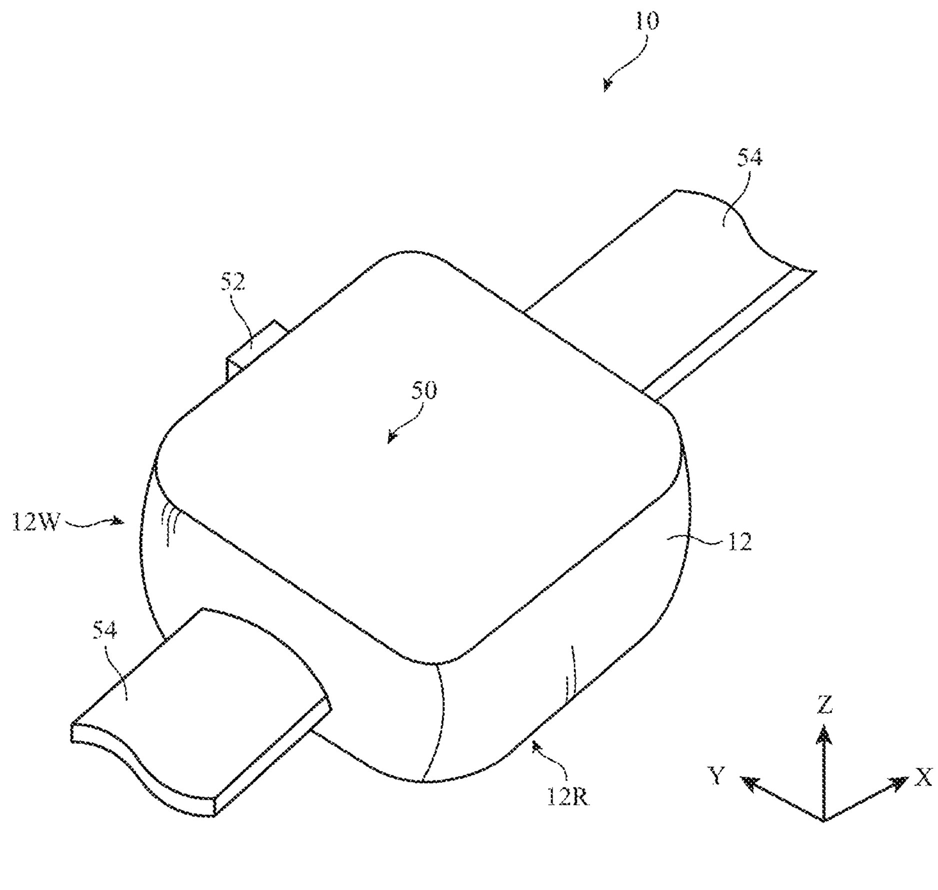
FIG. 3 is a perspective view of an illustrative electronic device in accordance with some embodiments.

In some configurations described herein as an illustrative example, device 10 as described in connection with FIG. 1 may be a portable device such as a wristwatch (e.g., a smart watch). Other configurations may be used for device 10 of FIG. 1, if desired. FIG. 3 is a perspective view of an illustrative portable electronic device that may implement device 10 of FIG. 1. In the example of FIG. 3, device 10 includes a display such as display 50. Display 50 may be mounted to a housing such as housing 12. Housing 12 may be formed using a unibody configuration in which some or all of housing 12 is machined or molded as a single structure or may be formed using multiple structures (e.g., an internal frame structure, one or more structures that form exterior housing surfaces, etc.). Housing 12 may have metal sidewalls such as sidewalls 12W and/or sidewalls formed from other materials. Examples of metal materials that may be used for forming sidewalls 12W include stainless steel, aluminum, silver, gold, metal alloys, or any other desired electrically conductive material. Sidewalls 12W may sometimes be referred to as housing sidewalls 12W or conductive housing sidewalls 12W.

Display 50 may be formed at (e.g., mounted on) the front face (or front face) of device 10. Housing 12 may have a rear housing wall on the rear face (or rear side) of device 10 such as rear housing wall 12R that opposes the front face of device 10. Conductive housing sidewalls 12W may surround the periphery of device 10 (e.g., conductive housing sidewalls 12W may extend around peripheral edges of device 10). Rear housing wall 12R may be formed from conductive materials and/or dielectric materials. Examples of dielectric materials that may be used for forming rear housing wall 12R include plastic, glass, sapphire, ceramic such as zirconia, wood, polymer, combinations of these materials, or any other desired dielectrics.

Rear housing wall 12R and/or display 50 may extend across some or all of the length (e.g., parallel to the X-axis) and width (e.g., parallel to the Y-axis) of device 10. Conductive housing sidewalls 12W may extend across some or all of the height of device 10 (e.g., parallel to the Z-axis). Conductive housing sidewalls 12W and/or rear housing wall 12R may form one or more exterior surfaces of device 10 (e.g., surfaces that are visible to a user of device 10) and/or may be implemented using internal structures that do not form exterior surfaces of device 10 (e.g., conductive or dielectric housing structures that are not visible to a user of device 10 such as conductive structures that are covered with layers such as thin cosmetic layers, protective coatings, and/or other coating layers that may include dielectric materials such as glass, ceramic, plastic, or other structures that form the exterior surfaces of device 10 and/or serve to hide housing walls 12R and/or 12W from view of the user).

Display 50 may include an array of display pixels formed from liquid crystal display (LCD) components, an array of electrophoretic display pixels, an array of plasma display pixels, an array of organic light-emitting diode (OLED) display pixels, an array of electrowetting display pixels, or display pixels based on other display technologies. Display 50 may be protected using a display cover layer. The display cover layer may be formed from a transparent material such as glass, plastic, sapphire or other crystalline dielectric materials, ceramic, or other clear materials. The display cover layer may extend across substantially all of the length and width of device 10, for example.

Device 10 may include one or more buttons such as button 52. There may be any suitable number of buttons in device 10. Buttons may be located in openings in housing 12 (e.g., openings in a conductive housing sidewall 12W or rear housing wall 12R). Buttons may be rotary buttons, sliding buttons, buttons that are actuated by pressing on a movable button member, etc. Button members for buttons such as button 52 may be formed from metal, glass, plastic, or other materials.

Device 10 may, if desired, be coupled to a strap such as strap 54. Strap 54 may be used to hold device 10 against a user's wrist (as an example). Strap 54 may sometimes be referred to herein as wrist strap 54 or watch band 54. In the example of FIG. 3, wrist strap 54 is connected to opposing sides of device 10. Conductive housing sidewalls 12W and/or rear housing wall 12R may include attachment structures for securing wrist strap 54 to housing 12 (e.g., lugs and/or other attachment mechanisms that configure housing 12 to receive wrist strap 54).

Figure 4:
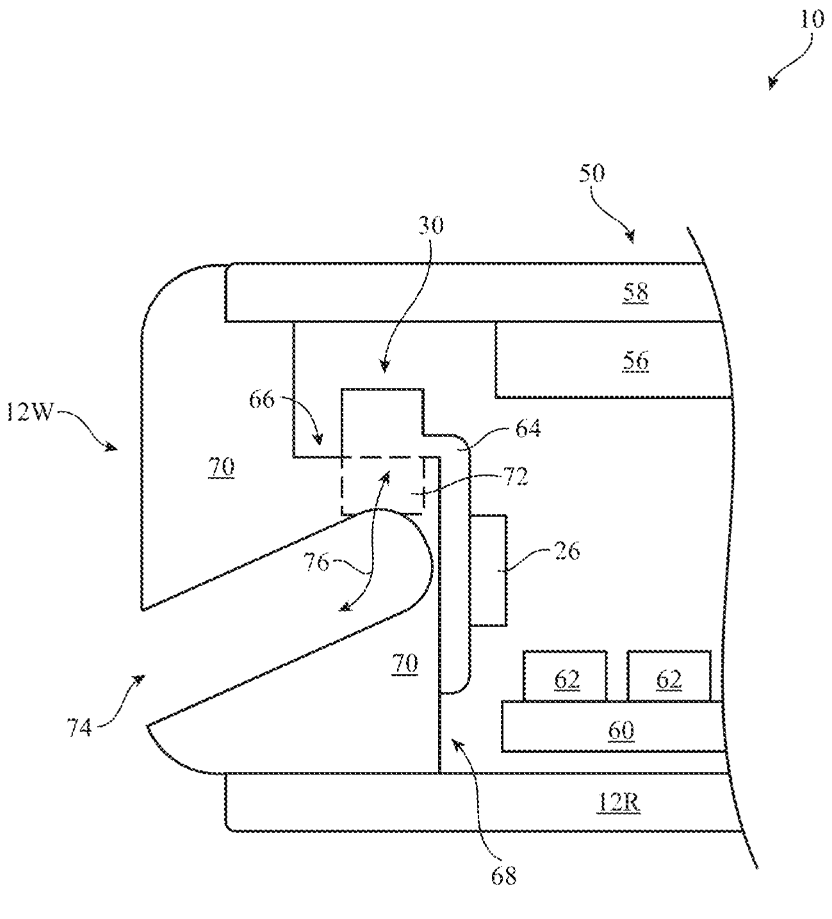
FIG. 4 is a cross-sectional view of an illustrative peripheral portion of an electronic device having wireless circuitry configured to operate through a slot in a housing sidewall in accordance with some embodiments.

FIG. 4 is a partial cross-sectional side view of electronic device 10, e.g., as described in connection with FIG. 3, containing wireless circuitry components mounted at an interior of device 10 for conveying radio-frequency signals through a housing sidewall 12W. As shown in FIG. 4, display 50 may form the front face of device 10 whereas rear housing wall 12R forms the rear face of device 10. In the example of FIG. 4, rear housing wall 12R may be formed from dielectric material(s) such as glass, sapphire, ceramic such as zirconia, and/or plastic. This is merely illustrative and, if desired, rear housing wall 12R may also include electrically conductive portions (e.g., a conductive frame surrounding one or more dielectric windows in rear housing wall 12R, conductive cosmetic layers, etc.).

Display 50 may include a display cover layer 58 over a display module 56. Display cover layer 58 may be mounted to housing 12, and more specifically, may be mounted to housing sidewalls 12W. Display module 56 may, for example, form an active area or portion of display 50 that displays images and/or receives touch sensor input. The lateral portion of display 50 that does not include display module 56 (e.g., portions of display 50 formed from display cover layer 58 but without an underlying portion of display module 56) may sometimes be referred to as the inactive area or portion of display 50.

Display module 56 may include conductive components (sometimes referred to as conductive display structures) that are used in forming portions of an antenna that radiates through the front face of device 10 (e.g., an antenna having a radiating element such as a radiating slot element defined by display module 56 and/or conductive housing sidewalls 12W). The conductive display structures in display module 56 may, for example, have planar shapes (e.g., planar rectangular shapes, planar circular shapes, etc.) and may be formed from metal and/or other conductive material that carries antenna currents for a front-facing antenna in device 10. The conductive display structures may include a frame for display module 56, pixel circuitry, touch sensor electrodes, an embedded near-field communications antenna, etc.

Display cover layer 58 may be formed from an optically transparent dielectric such as glass, sapphire, ceramic, and/or plastic. Display module 56 may display images (e.g., emit image light) through display cover layer 58 for view by a user and/or may gather touch or force sensor inputs through display cover layer 58. If desired, portions of display cover layer 58 may be provided with opaque masking layers (e.g., ink masking layers) and/or pigment to obscure the interior of device 10 from view of a user.

Device 10 may include one or more printed circuits such as rigid printed circuit boards and/or flexible printed circuits in the interior of device 10. In the example of FIG. 4, device 10 may include a printed circuit 60 on which one or more components 62 are mounted. Components 62 may be used to implement storage circuitry 16, processing circuitry 18 (e.g., baseband processing circuitry for wireless circuitry 24), radio-frequency transceiver circuitry 26, and/or other components of device 10 described in connection with FIG. 1. In some illustrative configurations described herein as an example, some components 62 may include radios or baseband processor circuitry implemented as integrated circuits (e.g., communicatively coupled to antenna 30 in FIG. 4). If desired, some components 62 may form transceiver circuitry 26 or other wireless circuitry components (e.g., radio-frequency front end module(s) containing filter circuitry, switching circuitry, amplifier circuitry, impedance matching circuitry, radio-frequency coupler circuitry, etc.) for antenna 30 in FIG. 4.

As one illustrative example, printed circuit 60 may include a printed circuit substrate for a system package (e.g., a system-in-package (SIP)) within device 10. Components 62 (e.g., one or more integrated circuits implementing control circuitry 14, wireless circuitry 24, other input-output circuitry 20, discrete electrical components, etc.) may be embedded within the system package (e.g., covered by encapsulating and/or shielding materials). Accordingly, printed circuit 60 and components 62 may form a system package in this example. In other examples, printed circuit 60 may form a main logic board (e.g., a printed circuit board) on which components 62 (e.g., integrated circuit dies and/or integrated circuit packages) are mounted.

Data may be conveyed between device 10 and external devices (e.g., external equipment 28). Accordingly, wireless communication circuitry such as wireless communication circuitry 24 (FIG. 1) may include wireless circuitry components (e.g., antennas, antenna tuning components, radio-frequency front end modules, radio-frequency transmission lines, radio-frequency transceiver circuitry, radios or baseband processors, etc.) for wirelessly conveying the data.

In some applications, the wireless communication circuitry may operate at relatively high frequencies such as at one or more centimeter and/or millimeter wave frequencies (e.g., frequencies between 10 and 300 GHz), at one or more terahertz frequencies (e.g., frequencies between 0.3 and 10 THz), etc., thereby allowing for high-data-rate data transfer, e.g., to replace bulky wired connectors. However, this can raise significant challenges. In particular, it can be challenging to provide the wireless circuitry operable at these frequencies in a compact manner, other components in the electronic device (e.g., other portions of the wireless circuitry, and conductive elements, housing structures, etc.) have the potential to interfere with the operation of the wireless circuitry.

Even outside of these applications, providing wireless circuitry components in a space-efficient manner can be challenging especially for compact portable electronic devices, such as a wristwatch device, where device interior space is limited and shared by numerous other device components. The configuration of wireless circuitry components should also provide satisfactory wireless performance (e.g., satisfy a particular data rate, a particular power efficiency or consumption metric, etc.) while maintaining an aesthetically pleasing device exterior appearance.

To address these challenges and/or in view of other considerations, an electronic device may include wireless circuitry that conveys radio-frequency signals through a housing sidewall and/or that includes wireless circuitry components provided on a flexible printed circuit that runs along interior housing surfaces (e.g., thereby facilitating compact yet customizable placement of the wireless circuitry components). In some illustrative configurations described herein as examples, electronic device 10 may include wireless circuitry configured in the above-mentioned manner.

In particular, as shown in the example of FIG. 4, device 10 may include wireless circuitry components such as radio-frequency transceiver circuitry 26 and antenna structures for antenna 30 provided on a printed circuit such as printed circuit 64. Printed circuit 64 may be mounted and attached to housing structures such as a housing sidewall 12W (e.g., a housing sidewall 12W parallel to the y-z plane in FIG. 3).

Configurations in which printed circuit 64 is a flexible printed circuit are sometimes described herein as an example. If desired, printed circuit 64 may include a combination of flexible printed circuit portion(s) and/or rigid printed circuit portion(s) (e.g., a flexible printed circuit coupled to one or more rigid printed circuit boards, a flexible printed circuit having reinforced rigid portions, etc.).

A flexible printed circuit or flexible portions of a printed circuit can include a flexible printed circuit substrate having layers formed from polyimide, liquid crystal polymer, other flexible polymer materials, and/or other suitable materials. If desired, the flexible printed circuit or flexible printed circuit portions may include multilayer laminated structures (e.g., layers of conductive material(s), such as copper, and layers of dielectric material(s), such as a resin, that are laminated together without intervening adhesive). The multilayer laminated structures may, if desired, be folded or bent in multiple dimensions (e.g., two or three dimensions) and may maintain a bent or folded shape after bending. In other words, the multilayer laminated structures may be folded into a particular three-dimensional shape to route around other device components and may be rigid enough to hold its shape after folding without being held in place by stiffeners or other structures. A rigid printed circuit board or rigid portions of a printed circuit may include a (rigid) printed circuit substrate formed from rigid printed circuit board material such as fiberglass-filled epoxy or fiberglass-epoxy laminate, ceramics, other rigid polymer materials, and/or other suitable materials. If desired, a printed circuit such as printed circuit 64 may be formed from one or more of these flexible and rigid structures and materials (e.g., at different portions of the substrate).

Housing sidewall 12W may include a ledge or shelf (portion) at the interior of device 10. The ledge portion of sidewall 12W may have a top surface 66 (sometimes referred to as ledge surface 66) and an interior-facing lateral or side surface 68. While surfaces 66 and 68 are each shown to be a flat (horizontal or vertical) planar surface, this is merely illustrative. If desired, surfaces 66 and 68 may each be sloped, may each be curved, and/or may each have other surface characteristics. In one illustrative example shown in FIG. 4, surface 66 may have at least a planar portion parallel to a planar portion of rear housing wall 12R and/or a planar portion of display cover layer 58, and surface 68 may have at least a planar portion perpendicular to the planar portion of surface 66.

As shown in FIG. 4, printed circuit 64 may have a portion on surface 66 and a portion on surface 68. Antenna structures for antenna 30 may be formed or embedded within substrate layers of the printed circuit portion on surface 66 or otherwise provided on (e.g., on a separate antenna carrier attached to) the printed circuit portion on surface 66. Accordingly, this printed circuit portion of printed circuit 64 may sometimes be referred to as forming an antenna module or antenna package. In the example of FIG. 4, these antenna structures disposed on surface 66 may face a downward direction (in the perspective of FIG. 4) and convey radio-frequency signals towards the rear (face) of device 10.

Printed circuit 64 may extend from surface 66 to surface 68 (and beyond, to other surfaces) to communicatively couple the antenna structures for antenna 30 to other wireless circuitry components such as antenna tuning components (e.g., capacitors, inductors, etc.), radio-frequency front end components, radio-frequency transceiver circuitry such as transceiver circuitry 26, and/or radios or baseband processing circuitry. Some or all of these other wireless circuitry components may be implemented as discrete electrical components mounted to printed circuit 64 and/or as integrated circuit dies and integrated circuit packages mounted to printed circuit 64. If desired, some or all of these other wireless circuitry components may be mounted to other printed circuit(s) such as printed circuit 60.

In the example of FIG. 4, a given wireless circuitry component such as radio-frequency transceiver circuitry 26 (e.g., an integrated circuit package implementing transceiver circuitry 26) is mounted to printed circuit 64 at a location on surface 68. However this is merely illustrative. In general, wireless circuitry components communicatively coupled to the antenna structures of antenna 30 on surface 66 may be mounted to printed circuit 64 at other locations such as at a location on a lateral side surface of an adjacent housing sidewall such as a housing sidewall 12W that is parallel to the x-z plane in FIG. 3). If desired, some or all of these wireless circuitry components may be mounted to a different printed circuit substrate such as a printed circuit substrate of printed circuit 60 (e.g., a system package substrate), and printed circuit 64 may run along surface 68 and/or other interior housing or device surfaces to connect to the wireless circuitry components on printed circuit 60.

In some illustrative configurations described herein as an example, sidewall 12W in FIG. 4 may include a slot such as exterior-facing slot 74. Exterior facing slot 74 may have a first (open) end that opens to or faces the exterior of device 10 and may have a second opposing (closed) end within sidewall 12W. Accordingly, the second end of slot 74 and opposing top and bottom sides (e.g., connecting the first and second ends of slot 74) may be defined and surrounded by portions of sidewall 12W (e.g., portion 70 at the lateral sides, portion 70 and portion 72 at the second end). In some examples described herein, slot 74 may be an air-filled or more generally fluid-filled slot. However, if desired, slot 74 may be filled (e.g., at least partly) with other dielectrics (e.g., solid dielectric material). Antenna 30 implemented on the portion of printed circuit 64 on surface 66 may transmit radio-frequency signals 76 through slot 74 to the exterior of device 10 and/or may receive radio-frequency signals 76 through slot 74 from the exterior of device 10.

Sidewall 12W in FIG. 4 may be formed from electrically conductive material such as metal. Accordingly, sidewall 12W may include one or more conductive portions 70. To facilitate conveyance of radio-frequency signals 76 by antenna 30 through slot 74, an intervening portion 72 of sidewall 12W between antenna structures for antenna 30 and the (second) closed end of slot 74 may be formed from dielectric material such as plastic or other polymers. Accordingly, this portion 72 may sometimes be referred to as a dielectric-filled gap in sidewall 12W. Dielectric portion 72 may be surrounded by conductive portion(s) 70 (e.g., an integral block of conductive material forming housing wall 12W, multiple segments of conductive material(s) forming housing wall 12W, etc.). Configured in this manner, antenna 30 may convey radio-frequency signals 76 through dielectric portion 72 and slot 74 between the interior and the exterior of device 10 (e.g., to form one or more wireless communication links 32 in FIG. 1).

Configurations in which slot 74 is a band slot or a strap slot configured to receive a band or strap that fastens or otherwise holds device 10 to a user's body (e.g., a user's wrist, a user's head, a user's arm, a user's finger, etc.) are sometimes described herein as an example. In these configurations, slot 74 may be configured to receive strap 54 (FIG. 3) and attachment mechanisms (e.g., lugs, mating magnetic structures, latches, press or friction fit structures, etc.) may be provided at or by slot 74 to secure strap 54 to housing sidewall 12W (e.g., with a portion of strap 54 placed and secured within slot 74). In these configurations, the housing sidewall 12W in FIG. 4 may be one of the two opposing housing sidewalls 12W parallel to the y-z plane in FIG. 3 and slot 74 may be an elongated slot having a length (e.g., the longest dimension) along the y-axis in FIG. 3.

If desired, antenna 30 on printed circuit 64 may be configured to convey radio-frequency signals through other types of slots (e.g., a slot that serves a function other than to receive strap 54) in sidewall 12W. If desired, antenna 30 on printed circuit 64 may be configured to convey radio-frequency signals through a non-slotted portion of sidewall 12W (e.g., through a dielectric portion of the sidewall 12W parallel to the x-z plane in FIG. 3 directly to the exterior of device 10).

When configured in the manner described in connection with FIG. 4, device 10 may be provided with wireless communication capabilities without substantially impacting the exterior appearance of device 10. By conforming printed circuit 64 and consequently the wireless circuitry components thereon to housing structures such sidewall 12W, device 10 may be provided with a space-efficient implementation while still providing flexibility for placement of wireless circuitry components. In some instances, the operation of antenna 30 through sidewall 12W may also help enhance antenna performance.

Figure 5:
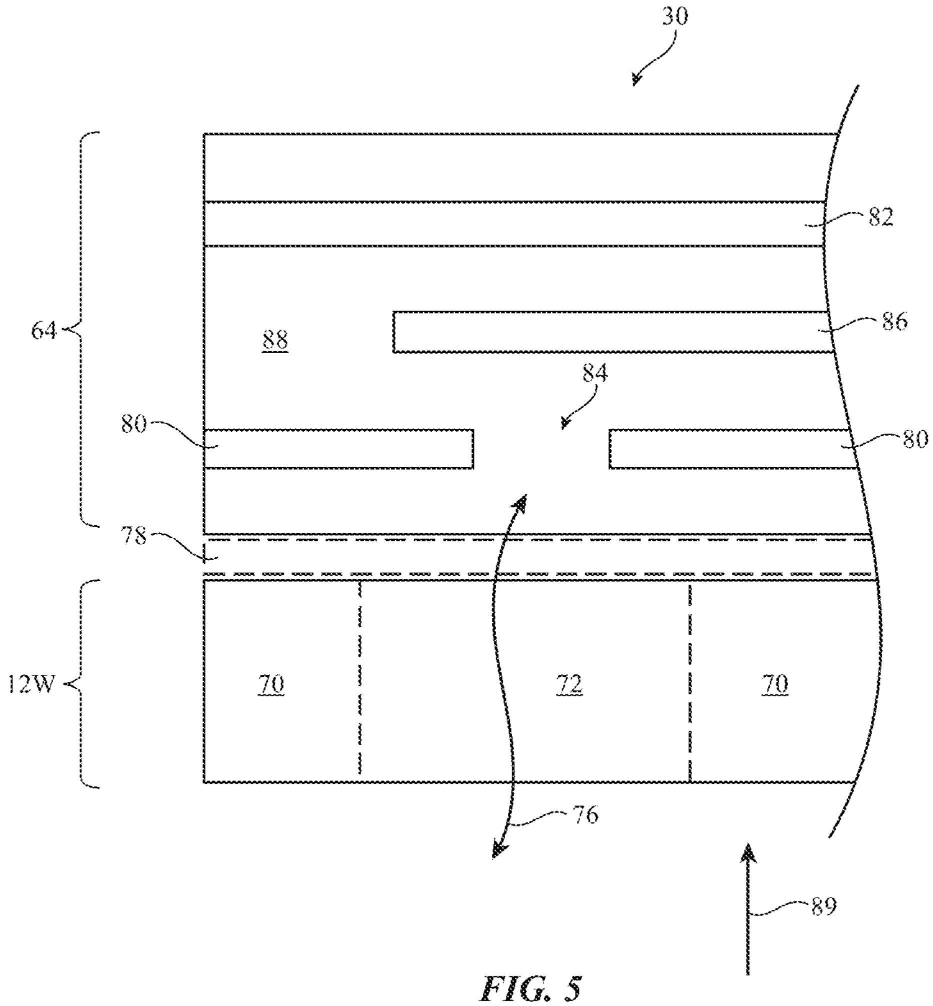
FIG. 5 is a cross-sectional view of antenna structures for an antenna provided on a printed circuit in accordance with some embodiments.

An illustrative implementation of the antenna structures for antenna 30 on a portion of printed circuit 64 (e.g., on the printed circuit portion on ledge surface 66 in FIG. 4) is shown in FIG. 5. In particular, printed circuit 64 may include one or more layers of dielectric and conductive material for forming the antenna structures.

In the example of FIG. 5, antenna 30 may include an antenna resonating element formed from conductive structure(s) 80 such as segment(s) of one or more metal layers in printed circuit 64. In some illustrative configurations described herein as an example, the antenna resonating element may be a slot antenna resonating element (sometimes referred to as a slot element) such as slot element 84. Slot element 84 may be formed from a dielectric-filled gap in a metal layer forming conductive structure 80 and may at least partly lie in the plane of the metal layer forming conductive structure 80. Accordingly, slot element 84 may have peripheral lateral sides (e.g., left and right sides in the perspective of FIG. 5) defined by conductive structure 80. As examples, slot element 84 may have one or more straight edges (e.g., having a rectangular shape with a rectangular lateral outline), may have one or more curved edges (e.g., having a meandering shape, having a rectangular shape with one or more curved edges, etc.), may have one or more bends or turns, and/or may have any other suitable shapes or lateral outlines.

Printed circuit 64 may include one or more ground structures that form an antenna ground for antenna 30. As an example, conductive structure 82 (e.g., one or more metal layers in printed circuit 64) may form an illustrative portion of the antenna ground. If desired, multiple (metal) antenna ground layers in printed circuit 64 may form different portions of the antenna ground. These different antenna ground layers may be electrically shorted to each other using vias or other interconnecting structures within printed circuit 64 such that the antenna ground surrounds other antenna elements such as antenna resonating element 84 (e.g., on the back and lateral sides). In this illustrative configuration, antenna 30 may operate as a cavity-backed slot antenna.

In the example of FIG. 5, antenna resonating element 84 may be fed using a feed element or a feed structure such as feed structure 86. Feed structure 86 may be formed from one or more metal layers in printed circuit 64 between the metal layer(s) forming conductive structure 80 and the metal layer(s) forming conductive structure 82. Feed structure 86 may be near-field electromagnetically coupled to conductive structure 80 forming edges of antenna resonating element 84. In other words, radio-frequency signals (e.g., signal currents) to be transmitted by antenna 30 may be provided to feed structure 86 (e.g., via transmission line structures electrically shorted to feed structure 86), and feed structure 86 may induce corresponding radio-frequency signals (e.g., corresponding signal currents) on conductive structure 80

(e.g., at the edges defining slot element 84), thereby facilitating signal transmission. Analogously, radio-frequency signals (e.g., signal currents) to be received by antenna 30 may be first received by conductive structure 80, and conductive structure 80 may induce corresponding radio-frequency signals (e.g., signal currents) on feed structure 86 which conveys the radio-frequency signals to downstream wireless circuitry via corresponding transmission line structures, thereby facilitating signal reception.

Printed circuit 64 may include intervening dielectric material between each pair of conductive structures 80, 82, and 86. The dielectric material may be from one or more dielectric layers between the metal layers forming conductive structures 80, 82, and 86.

The portion of printed circuit 64 shown in FIG. 5 may be attached to sidewall 12W (e.g., ledge surface 66 of sidewall 12W in FIG. 4). An illustrative portion of sidewall 12 W (e.g., the portion adjacent to the closed end of slot 74 in FIG. 4) is shown in FIG. 5. As an example, an adhesive layer 78 may be used to attach printed circuit 64 to sidewall 12W. If desired, other suitable attachment mechanisms may be used to attach printed circuit 64 to sidewall 12W (e.g., at ledge surface 66 and/or at other interior housing surfaces such as surface 68 in FIG. 4). Antenna resonating element 84 may be aligned with and overlap dielectric portion 72 of sidewall 12W. Conductive portion 70 of sidewall 12W may laterally surround dielectric portion 72 of sidewall 12W.

While antenna 30 is implemented with a slot antenna resonating element 84 in the example of FIG. 5, this is merely illustrative. If desired, antenna 30 may be implemented with other types of antenna resonating elements such as those described in connection with antennas 30 in FIG. 1. If desired, the antenna resonating element (e.g., slot element 84 or another type of antenna resonating element) of antenna 30 may be directly fed by and electrically shorted to one or more signal conductors in a radio-frequency transmission line (e.g., using one or more vias that electrically connects the signal conductor(s) to positive antenna feed terminal(s) at the antenna resonating element), rather than being fed through a near-field coupled feed structure 86.

While an illustrative antenna 30 is shown in the examples of FIGS. 4 and 5, any suitable number of antennas 30 (e.g., antennas 30-1, 30-2, . . . ) may be provided on printed circuit 64, attached to sidewall 12R (e.g., on the same ledge surface 66), and configured to convey radio-frequency signals through dielectric-portion(s) of sidewall 12R and through the same slot 74 in FIG. 4. If desired, some of these antennas 30 may have the same configuration (e.g., the configuration for antenna 30 shown in FIG. 5). If desired, some of these antennas 30 may have different configurations (e.g., with different types of antenna resonating elements, with coverage for different frequencies and/or polarizations, with different functions such as an transmit antenna 30-1 with a signal transmission function and a receive antenna 30-2 with a signal reception function, etc.).

Configurations in which two antennas 30-1 and 30-2 are provided on printed circuit 64 are sometimes described herein as an illustrative example. In this example, antennas 30-1 and 30-2 may have the same antenna structures (e.g., each including an indirectly fed slot antenna resonating element) but may have different functions (e.g., antenna 30-1 may be a transmit antenna and antenna 30-2 may be a receive antenna).

Figure 6:
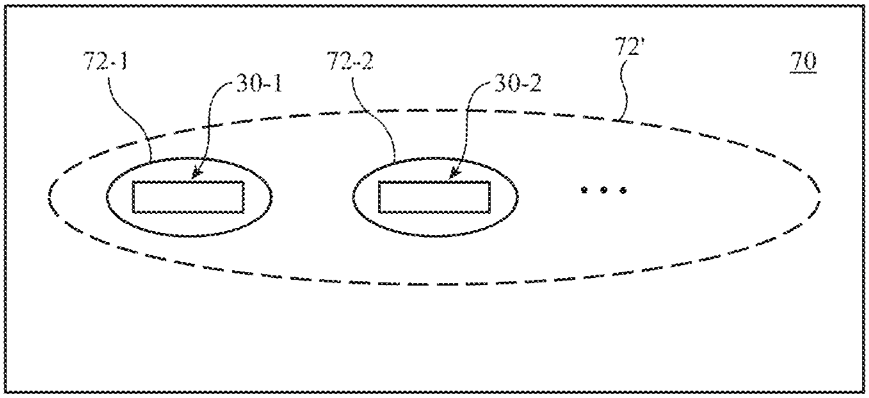
FIG. 6 is a diagram of illustrative dielectric-filled opening(s) in an electronic device housing sidewall aligned with one or more corresponding antennas in accordance with some embodiments.

FIG. 6 is a diagram of an illustrative portion of sidewall 12W (e.g., sidewall 12W adjacent to the second closed end of slot 74 in FIG. 4) overlapping one or more antennas 30 formed on printed circuit 64. The view of conductive portion 70 and dielectric portion(s) 72 of sidewall 12W may be taken when viewing sidewall 12W in direction 89 as shown in FIG. 5 (e.g., when viewing sidewall 12W from the closed end of slot 74 in FIG. 4).

As shown in the example of FIG. 6, a separate dielectric portion 72 of sidewall 12W may be aligned with and overlap each antenna 30 (e.g., each antenna resonating element in the corresponding antenna 30). More specifically, a first dielectric portion 72-1 of sidewall 12W may overlap the antenna resonating element of antenna 30-1, a second dielectric portion 72-1 of sidewall 12W may overlap the antenna resonating element of antenna 30-2, and so on. A conductive portion 70 of sidewall 12W may laterally surround each of the separate dielectric portions 72-1, 72-2, etc., thereby separating them from each other.

If desired, a single larger dielectric portion 72' of sidewall 12W may be aligned with and overlap each of antennas 30-1, 30-2, etc. instead of the multiple smaller dielectric portions 72-1, 72-2, etc. In other words, in some illustrative configurations, a single dielectric-filled opening in sidewall 12W (e.g., dielectric portion 72') may overlap each of antennas 30-1, 30-2, etc., and in other illustrative configurations, multiple dielectric-filed openings in sidewall 12W (e.g., dielectric portions 72-1, 72-2, etc.) may each overlap a corresponding one of antennas 30-1, 30-2, etc.

While the portion of printed circuit 64 implementing antenna(s) 30 may be disposed on ledge surface 66 (FIG. 4), other portion(s) of printed circuit 64 may be disposed on other interior housing or device surfaces. Accordingly, printed circuit 64 may be a flexible printed circuit or may at least include bendable portions (e.g., connecting rigid portions of printed circuit 64).

Figure 7:
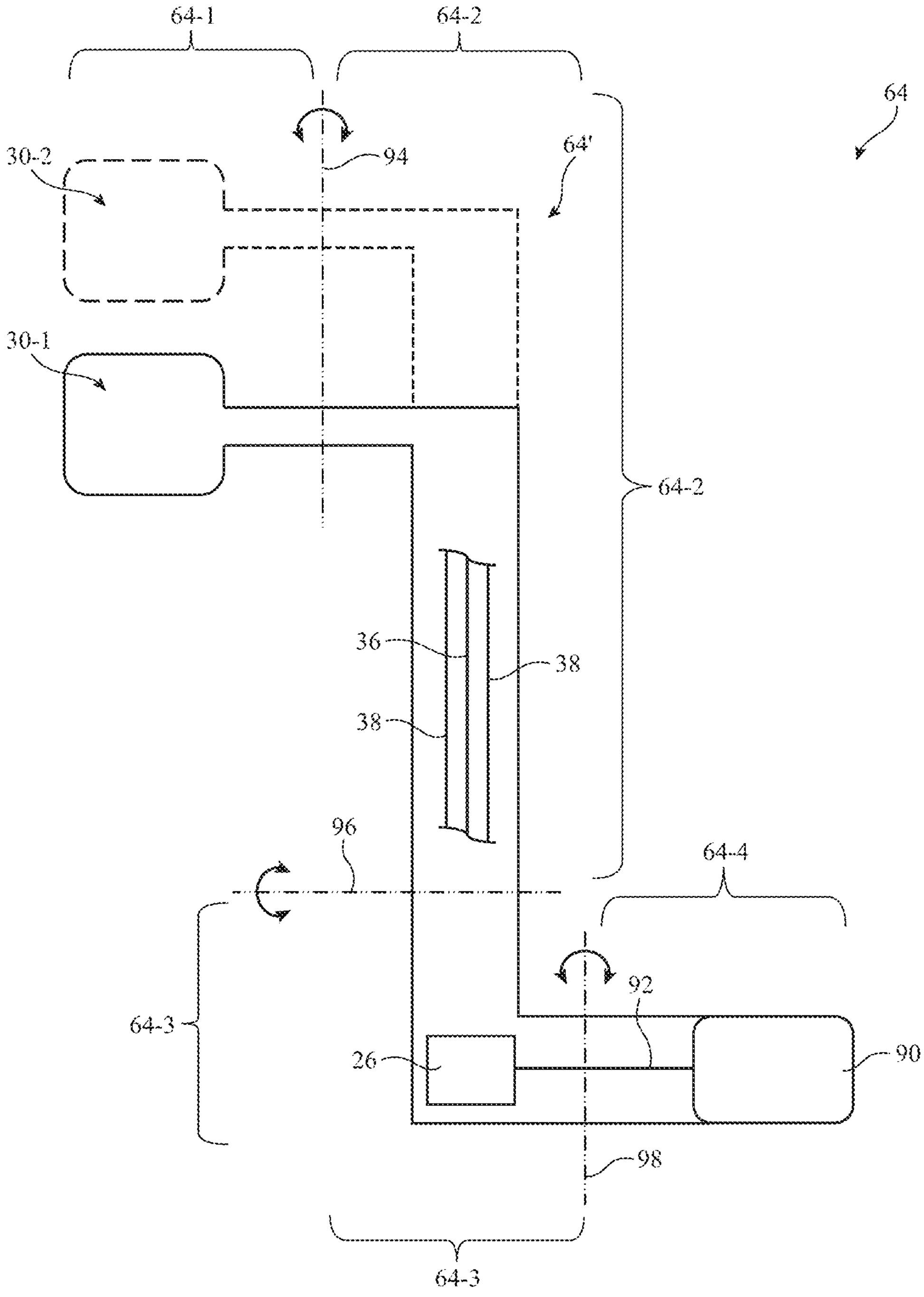
FIG. 7 is a diagram of an unfolded flexible printed circuit on which wireless circuitry components are provided in accordance with some embodiments.

FIG. 7 is a diagram of an illustrative printed circuit 64 in a flattened or unfolded state (e.g., prior to being shaped for mounting to housing sidewall 12R as shown in FIG. 4). As shown in FIG. 7, multiple antennas such as antennas 30-1 and 30-2 (e.g., generally any suitable number of antennas) may be implemented on printed circuit 64. Each of antennas 30 implemented on printed circuit 64 may be formed in the manner described in connection with FIGS. 4 and 5 (e.g., aligned with dielectric material in sidewall 12W, configured to convey radio-frequency signals through (the same) slot 74, formed from metal and insulator layers in a portion of printed circuit 64 overlapping and attached to the same ledge surface 66. While antennas 30-1 and 30-2 are shown to be formed on separate sections of printed circuit 64, antennas 30-1 and 30-2 may be formed on a shared integral section of printed circuit 64, if desired.

In the example of FIG. 7, printed circuit 64 may include a first portion 64-1 configured to be disposed on a first interior device surface (e.g., top surface 66 in FIG. 4). As described in connection with FIG. 5, portion 64-1 may include antenna structures for antennas 30.

Printed circuit 64 may include a second portion 64-2 configured to be disposed on a second interior device surface (e.g., side surface 68 in FIG. 4). Portion 64-2 may include radio-frequency transmission line structures forming one or more transmission line paths 34 (FIG. 2). As an example, the transmission line structures may include a signal conductor 36 for each transmission line and one or more grounding structures (e.g., forming a ground conductor 38) for each transmission line. Signal conductor 36 may be electrically shorted to a positive antenna feed terminal at a feed structure such as feed structure 86 in an indirect feeding scheme or may be electrically shorted to a positive antenna feed terminal at an antenna resonating element (e.g., shorted to conductive structure 80 forming one of the edges of slot antenna resonating element 84). Ground conductor 38 may be electrically shorted to portions of the antenna ground (e.g., conductive structure 82 in FIG. 5). These transmission line structures may extend into the other portions of printed circuit 64 (e.g., portion 64-1, portion 64-3, and portion 64-4) to convey radio-frequency signals between different wireless circuitry components. In one illustrative configuration ground conductor 38 may be formed from multiple metal layers (e.g., top and bottom metal layers on opposing sides of signal conductor 36) that are electrically shorted to each other using via structures that run along the length of the radio-frequency transmission line.

Printed circuit 64 may include a third portion 64-3 configured to be disposed on a third interior device surface (e.g., an interior housing surface other than surfaces 66 and 68 in FIG. 4). As an example, radio-frequency transceiver circuitry 26 may be mounted to portion 64-3 of printed circuit 64. Radio-frequency transceiver circuitry 26 may be coupled to antenna(s) 30 via the one or more corresponding transmission lines (as described above), e.g., in portions 64-3, 64-2, and 64-1.

Printed circuit 64 may include a fourth portion 64-4 configured to be disposed on a fourth interior device surface (or may generally be configured to provide external connection to the first, second, and third portions of printed circuit 64). As an example, a connector 90 (e.g., a board-to-board connector) may be provided on portion 64-4 (e.g., provided at one end of printed circuit 64 opposite the other end of printed circuit 64, at portion 64-1, forming antenna structures). Connector 90 may be communicatively coupled to transceiver circuitry 26 via one or more signal paths 92 (e.g., radio-frequency signal paths, intermediate frequency signal paths, data signal paths, control signal paths, etc.). Connector 90 on portion 64-4 may facilitate connection between printed circuit 64 (e.g., the wireless circuitry components thereon) and other components in device 10 such as another printed circuit (e.g., printed circuit 60 in FIG. 4). Accordingly, the fourth interior device surface on which portion 64-4 is disposed may be a surface of printed circuit 60.

To position portion 64-1 adjacent to the first interior device surface while positioning portion 64-2 to be adjacent to the second interior device surface, printed circuit 64 may be bendable (e.g., may have at least a flexible or bendable portion) between portions 64-1 and 64-2. Accordingly, printed circuit 64 may be configured to exhibit a bend about bend axis 94. To position portion 64-2 adjacent to the second interior device surface while positioning portion 64-3 to be adjacent to the third interior device surface, printed circuit 64 may be bendable (e.g., may have at least a flexible or bendable portion) between portions 64-2 and 64-3. Accordingly, printed circuit 64 may be configured to exhibit a bend about bend axis 96. To position portion 64-3 adjacent to the third interior device surface while positioning portion 64-4 adjacent to the fourth interior device surface, printed circuit 64 may be bendable (e.g., have at least a flexible or bendable portion) between portions 64-3 and 64-4. Accordingly, printed circuit 64 may be configured to exhibit a bend about bend axis 98.

Figure 8:
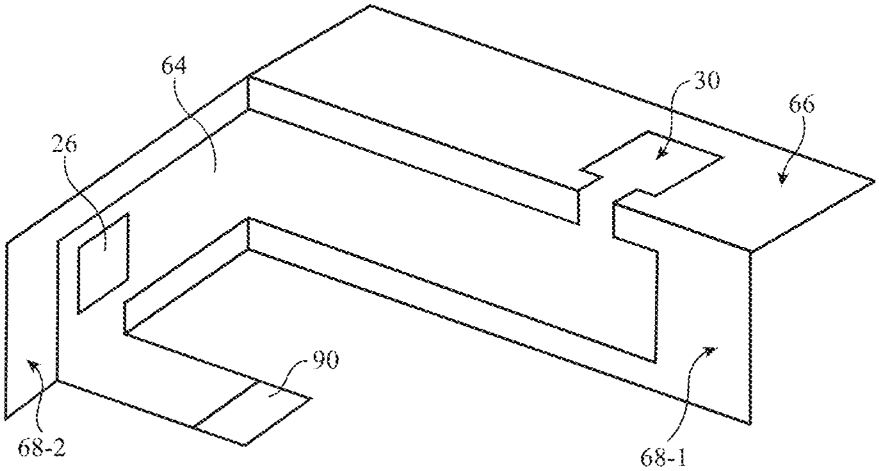
FIG. 8 is a diagram of a folded flexible printed circuit on multiple interior surfaces of electronic device housing structures in accordance with some embodiments.

FIG. 8 is a perspective view of an illustrative printed circuit 64 in a folded state and mounted to various interior housing surfaces within device 10. In the example of FIG. 8, the first portion of printed circuit 64 (e.g., portion 64-1 in FIG. 7) may be disposed on and attached to ledge surface 66 (e.g., ledge surface 66 of sidewall 12W in FIG. 4), the second portion of printed circuit 64 (e.g., portion 64-2 in FIG. 7) may run along (and if desired, be attached to) side surface 68-1 (e.g., side surface 68 of sidewall 12W in FIG. 4), and the third portion of printed circuit 64 (e.g., portion 64-3) may be run along (and if desired, be attached to) side surface 68-2. For example, side surface 68-2 may be an interior side surface of another housing sidewall 12W adjacent to housing sidewall 12W in FIG. 4. The two housing sidewalls may be joined at a corner of device 10, and side surfaces 68-1 and 68-2 may be joined along an edge.

The fourth portion of printed circuit 64 (e.g., portion 64-4 in FIG. 7) having connector 90 may extend from the bottom of surface 68-2 towards a mating connector for connector 90. As an example, the mating connector may be provided on another printed circuit, and the fourth portion of printed circuit 64 may run across a portion of the printed circuit to facilitate connection between connector 90 and the mating connector on the other printed circuit (e.g., a main logic board, a system-in-package, etc.). In particular, a component 62 in FIG. 4 may include the mating connector, and printed circuits 64 and 60 may be connected by connecting connector 90 to the mating connector on component 62.

Figure 9:
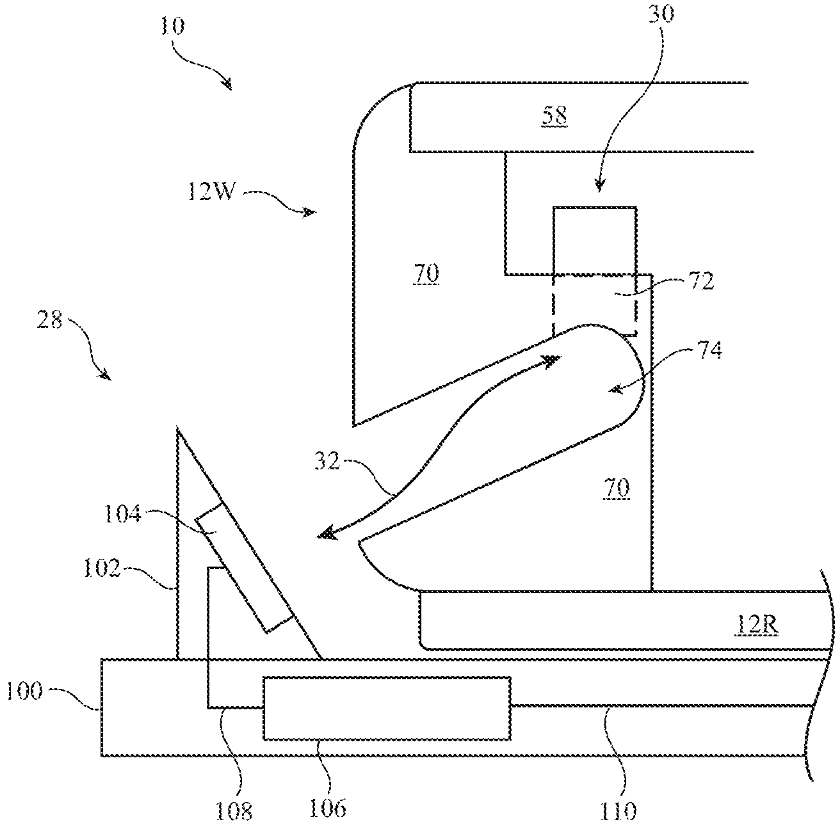
FIG. 9 is a diagram of illustrative external equipment configured to perform wireless communication with an electronic device through a slot in an electronic device housing sidewall in accordance with some embodiments.

FIG. 9 is a diagram of illustrative external equipment such as equipment 28 (FIG. 1) configured to transmit and/or receive data using one or more wireless communication links with electronic device 10, e.g., for using wireless circuitry implemented in the manner(s) described in connection with FIGS. 4-8. Some components of electronic device 10 shown in FIGS. 4-8 have been omitted from FIG. 9 in order to not unnecessary obscure the embodiments of FIG. 9.

External equipment 28 may include support structures forming a device dock 100 (sometimes referred to as device carrier 100 or carrier platform 100) that is configured to receive device 10 (e.g., rear housing wall 12R of device 10 may rest on dock 100). These support structures of dock 100 may be formed of plastic, glass, ceramics, fiber composites, metal, other suitable materials, or a combination of these materials. Components (e.g., control circuitry, input-output devices, etc.) for equipment 28 such as wireless circuitry components 106 (e.g., radio-frequency transceiver circuitry, radios or baseband processing circuitry, etc.) may be mounted on dock 100. A raised platform 102 on dock 100 may have an angled surface at which one or more antennas 104 for equipment 28 are disposed. Antennas 104 may be coupled to wireless circuitry components 106 via one or more radio-frequency transmission lines 108. The wireless circuitry components 106 may further be coupled to other circuitry (e.g., control circuitry) implemented on or off equipment 28.

Antennas 104 of equipment 28 may establish a corresponding wireless communication link 32 with respective antennas 30 on device 10 by conveying radio-frequency signals through slot 74 and dielectric portion 72 in housing sidewall 12W. Slot 74 may be formed in sidewall 74 at an angle (e.g., upward sloping angle). The angled surface of raised platform 102 may help provide antennas 104 in alignment with slot 74 to more efficiently convey data over wireless communication link 32.

In some illustrative configurations sometimes described herein as an example, wireless communication link 32 may be a full-duplex link formed by at least a pair of antennas 104 and at least a pair of antennas 30. In particular, a first (transmit) antenna 30 of device 10 may transmit signals to be received by a first (receive) antenna 104 of equipment 28 while a second (transmit) antenna 104 of equipment 28 transmits signals to be received by a second (receive) antenna 30 of device 10, thereby providing a full-duplex link.

In some illustrative configurations sometimes described herein as an example, equipment 28 may be test equipment or debugging equipment for device 10. Accordingly, wireless communication link 32 may be used to convey data for testing, debugging, and/or restoring the firmware or software of electronic device 10.

In some illustrative configurations sometimes described herein as an example, wireless communication link 32 may convey data across short distances and/or at high data rates. As examples, wireless communication link 32 may be established between antennas 30 and 104 separated by a distance of less than 10 inches, less than five inches, less than four inches, less than two inches, less than one inch, etc. and/or greater than one inch, greater than two inches, greater than five inches, etc. As examples, wireless communication link 32 may convey data at data rates of 100 Kilobit per second or more, 1 Megabit per second (Mbps) or more, 100 Mbps or more, at 500 Mbps or more, 1 Gigabit bit per second or more, etc.

These configurations and examples described in connection with FIG. 9 are merely illustrative. If desired, device 10 may use antennas 30 and other wireless circuitry components configured in the manner described in connection with FIGS. 4-8 to convey radio-frequency signals for other applications, with other types of external equipment, across other (greater) distances, at other data rates, etc.

The foregoing is merely illustrative and various modifications can be made to the described embodiments. The foregoing embodiments may be implemented individually or in any combination.

What is claimed is:

1. An electronic device having front and rear faces, the electronic device comprising:

a housing that includes a rear housing wall at the rear face and that includes a housing sidewall;

a slot with a closed end in the housing sidewall and with an opposing open end that opens to an exterior of the electronic device;

a display mounted to the housing at the front face;

a printed circuit on the housing sidewall; and an antenna formed from antenna structures in the printed circuit and configured to convey radio-frequency signals through the housing sidewall and through the slot.

2. The electronic device defined in claim 1, wherein the printed circuit comprises a flexible printed circuit.

3. The electronic device defined in claim 2, wherein the flexible printed circuit is disposed on first and second interior surfaces of the housing sidewall.

4. The electronic device defined in claim 3 further comprising:

radio-frequency transceiver circuitry coupled to the antenna and mounted to the printed circuit.

5. The electronic device defined in claim 3, wherein the housing sidewall has a ledge portion at an interior of the electronic device, the first interior surface is a top surface of the ledge portion, and the second interior surface is a side surface of the ledge portion.

6. The electronic device defined in claim 5, wherein the housing has an additional housing sidewall adjacent to the housing sidewall, the flexible printed circuit is disposed on a third interior surface on the additional housing sidewall, and radio-frequency circuitry is mounted to a portion of the printed circuit on the third interior surface.

7. The electronic device defined in claim 5, wherein the antenna comprises an antenna resonating element formed from a first metal layer in a portion of the printed circuit on the top surface of the ledge portion of the housing sidewall and comprises an antenna ground formed from a second metal layer in the portion of the printed circuit.

8. The electronic device defined in claim 7, wherein the antenna is a slot antenna formed from a slot element in the first metal layer, and the antenna comprises a feed structure formed from a third metal layer in the portion of the printed circuit and configured to convey the radio-frequency signals with the slot element using near-field electromagnetic coupling.

9. The electronic device defined in claim 7 further comprising:

an adhesive layer that attaches the portion of the printed circuit to the top surface of the ledge portion of the housing sidewall.

10. The electronic device defined in claim 5 further comprising:

a radio-frequency transmission line coupled to the antenna and having radio-frequency transmission line structures formed in a portion of the printed circuit on the side surface of the ledge portion of the housing sidewall.

11. The electronic device defined in claim 1, wherein the slot is a fluid-filled slot.

12. The electronic device defined in claim 1, wherein the housing sidewall has a dielectric portion between the antenna and the closed end of the slot, and the antenna is configured to convey the radio-frequency signals through the dielectric portion of the housing sidewall.

13. The electronic device defined in claim 12, wherein the housing sidewall has a conductive portion that surrounds the dielectric portion and that defines edges of the slot.

14. A wristwatch comprising:

a housing having a housing sidewall;

an exterior-facing slot having a closed end in the housing sidewall;

a display having a display cover layer mounted to the housing sidewall; and an antenna that includes an antenna resonating element overlapping the closed end of the exterior-facing slot and is configured to convey radio-frequency signals through a dielectric portion of the housing sidewall and through the closed end of the exterior-facing slot.

15. The wristwatch defined in claim 14 further comprising:

radio-frequency transceiver circuitry coupled to the antenna; and a flexible printed circuit having a bend about a bend axis, wherein the antenna comprises antenna structures in the flexible printed circuit that form the antenna resonating element.

16. The wristwatch defined in claim 15, wherein the flexible printed circuit has first, second, and third portions, the first and second portions of the flexible printed circuit bend with respect to each other about the bend axis, and the second and third portions of the flexible printed circuit bend with respect to each other about an additional bend axis.

17. The wristwatch defined in claim 16, wherein the first, second, and third portions of the flexible printed circuit are disposed on first, second, and third interior housing surfaces of the housing, respectively.

18. The wristwatch defined in claim 14, wherein the exterior-facing slot is configured to receive a wrist strap.

19. An electronic device comprising:

a housing having a housing sidewall with a first interior housing surface and a second interior housing surface adjacent to the first interior housing surface, the housing sidewall having a dielectric portion at the first interior housing surface;

a flexible printed circuit having a first portion attached to the first interior housing surface and a second portion that runs along the second interior housing surface; and an antenna having antenna structures in the first portion of the flexible printed circuit, the antenna structures overlapping the dielectric portion of the housing sidewall at the first interior housing surface, wherein the antenna structures are configured to convey radio-frequency signals through the dielectric portion of the housing sidewall at the first interior housing surface.

20. The electronic device defined in claim 19, wherein the flexible printed circuit has a first end at the first portion and an opposing second end, the electronic device further comprising:

a connector at the second end of the flexible printed circuit;

radio-frequency transmission line structures in the second portion of the flexible printed circuit; and radio-frequency transceiver circuitry on the flexible printed circuit.

* * * * *